United States Patent
Kennedy

(10) Patent No.: US 8,001,603 B1
(45) Date of Patent: Aug. 16, 2011

(54) VARIABLE SCAN OF FILES BASED ON FILE CONTEXT

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1024 days.

(21) Appl. No.: 11/492,290

(22) Filed: Jul. 24, 2006

(51) Int. Cl.
*G06F 21/00* (2006.01)

(52) U.S. Cl. ......... 726/24; 726/22; 726/23; 726/25; 726/27; 726/28; 726/29; 726/30; 713/165; 713/166

(58) Field of Classification Search .......... 726/22–25, 726/27–30; 713/165–166
See application file for complete search history.

(56) References Cited

U.S. PATENT DOCUMENTS

| 7,188,367 B1 * | 3/2007 | Edwards et al. ............ 726/24 |
| 7,627,898 B2 * | 12/2009 | Beck et al. ............ 726/23 |
| 2003/0023864 A1 * | 1/2003 | Muttik et al. ............ 713/200 |
| 2007/0079379 A1 * | 4/2007 | Sprosts et al. ............ 726/24 |

* cited by examiner

*Primary Examiner* — Vivek Srivastava
*Assistant Examiner* — Helai Salehi
(74) *Attorney, Agent, or Firm* — Gunnison McKay & Hodgson, L.L.P.; Forrest Gunnison

(57) ABSTRACT

The file context of a target file to be scanned is determined and the scan level for the file context is determined. Generally, the security risk for each file context is assessed, and the scan level appropriate for the security risk is associated with the file context. The target file is scanned at the scan level. Accordingly, a target file having a file context indicating that the file is a high security risk is scanned at a high scan level, i.e., is subject to a maximum-security scan. In this manner, high-level security is maintained. Conversely, a target file having a file context indicating that the file is a low security risk is scanned at a low scan level, i.e., is subject to a minimum-security scan or no scan at all. In this manner, high security is maintained while at the same time maximum performance is achieved.

14 Claims, 4 Drawing Sheets

VARIABLE SCAN OF FILES BASED ON FILE CONTEXT

BACKGROUND

1. Field of the Invention

The present invention relates to computer system security. More particularly, the present invention relates to a system and method of detecting and removing malicious code from a computer system.

2. Description of the Related Art

As is well known, an antivirus scanner scans for malicious code on a computer system. There is a tradeoff between full-security, which is slow, and sufficient security, which can be faster. Stated another way, the more files that are scanned, the greater the security and the slower the scan time and vice versa.

However, the slower the scan time, the greater the performance hit on the computer system. Accordingly, there is a balance between security and performance.

SUMMARY OF THE INVENTION

In accordance with one embodiment, the file context of a target file to be scanned is determined and the scan level for the file context is determined. Generally, the security risk for each file context is assessed, and the scan level appropriate for the security risk is associated with the file context.

The target file is scanned at the scan level. Accordingly, a target file having a file context indicating that the file is a high security risk is scanned at a high scan level, i.e., is subject to a maximum-security scan. In this manner, high-level security is maintained. Conversely, a target file having a file context indicating that the file is a low security risk is scanned at a low scan level, i.e., is subject to a minimum-security scan or no scan at all. In this manner, high security is maintained while at the same time maximum performance is achieved.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
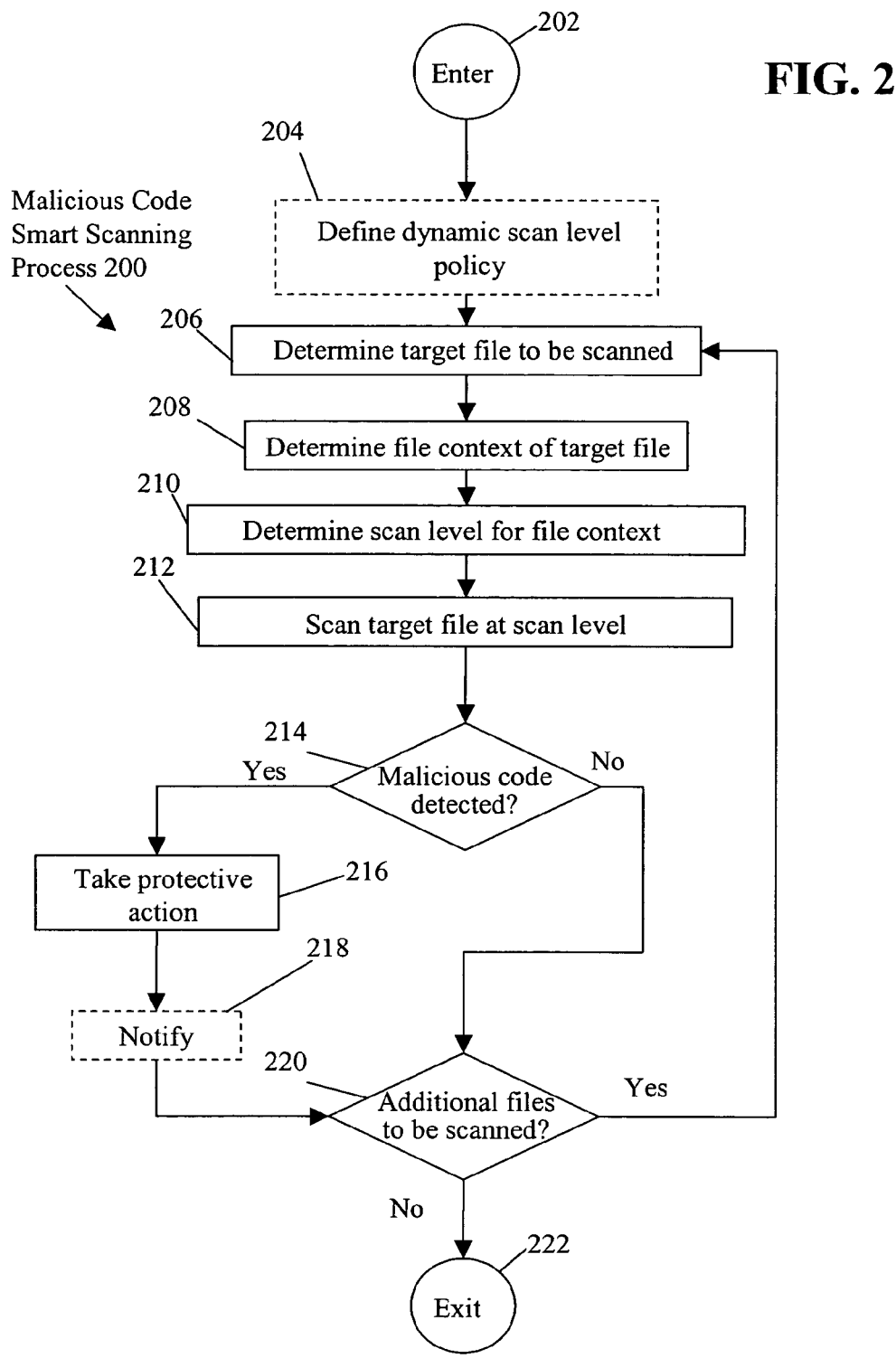
FIG. 2 is a flow diagram of a malicious code smart scanning process for detecting and removing malicious code in accordance with one embodiment of the present invention.

In accordance with one embodiment, referring to FIG. 2, the file context of a target file to be scanned is determined (OPERATION 208). The scan level for the file context is determined (OPERATION 210). Generally, the security risk for each file context is assessed, and the scan level appropriate for the security risk is associated with the file context.

The target file is scanned at the scan level (OPERATION 212). Accordingly, a target file having a file context indicating that the file is a high security risk is scanned at a high scan level, i.e., is subject to a maximum-security scan. In this manner, high-level security is maintained. Conversely, a target file having a file context indicating that the file is a low security risk is scanned at a low scan level, i.e., is subject to a minimum-security scan or no scan at all. In this manner, high security is maintained while at the same time maximum performance is achieved.

Figure 1:
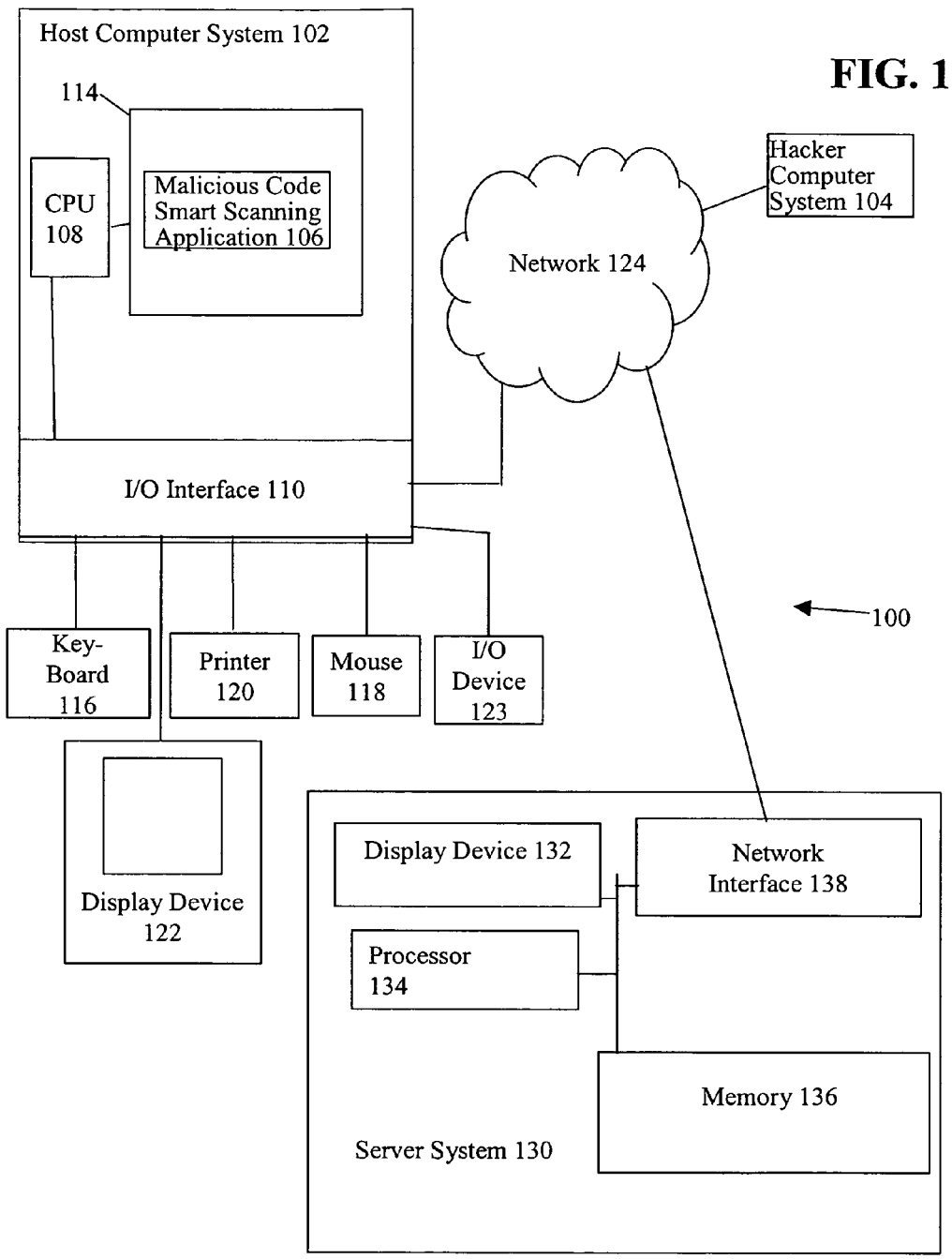
FIG. 1 is a diagram of a client-server system that includes a malicious code smart scanning application executing on a host computer system in accordance with one embodiment of the present invention.

More particularly, FIG. 1 is a diagram of a client-server system 100 that includes a malicious code smart scanning application 106 executing on a host computer system 102 in accordance with one embodiment of the present invention.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, malicious code smart scanning application 106 is loaded into host computer system 102 via I/O device 123, such as from a CD, DVD, or floppy disk containing malicious code smart scanning application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104 are also associated with network 124.

Network 124 can be any network or network system that is of interest to a user. In various embodiments, network interface 138 and I/O interface 110 include analog modems, digital modems, or a network interface card.

Malicious code smart scanning application 106 is stored, for example, in memory 114 of host computer system 102 and executed on host computer system 102.

The particular type of and configuration of host computer system 102, server system 130, and hacker computer system 104 are not essential to this embodiment of the present invention.

Herein, in one embodiment, malicious code is defined as any computer program, module, set of modules, or code that enters a computer system environment without an authorized user's knowledge and/or without an authorized user's consent. A computer virus is one example of a malicious code. For example, the malicious code is propagated from hacker computer system 104 to host computer system 102.

FIG. 2 is a flow diagram of a malicious code smart scanning process 200 for detecting and removing malicious code in accordance with one embodiment of the present invention. Referring now to FIGS. 1 and 2 together, in one embodiment, execution of malicious code smart scanning application 106 by processor 108 results in the operations of malicious code smart scanning process 200 as described below.

From an ENTER OPERATION 202, flow moves, optionally, to a DEFINE DYNAMIC SCAN LEVEL POLICY OPERATION 204. In DEFINE DYNAMIC SCAN LEVEL POLICY OPERATION 204, a dynamic scan level policy is defined. In accordance with one embodiment, a dynamic scan level policy is a policy that defines the scan level, e.g., scrutiny, that a file is subject to depending upon the file context of the file. A file is generally any collection of data or information, and typically includes a filename. Files include container files for containing files, e.g., .ZIP files.

Figure 3:
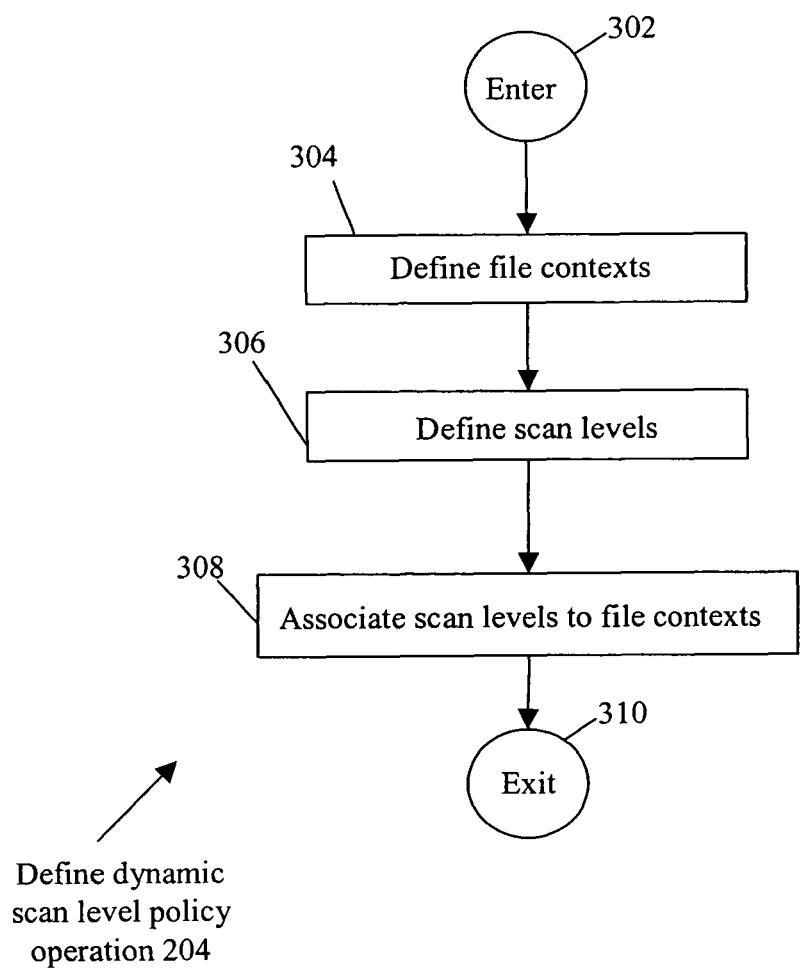
FIG. 3 is a flow diagram of a DEFINE DYNAMIC SCAN LEVEL POLICY OPERATION of FIG. 2 in accordance with one embodiment of the present invention.

FIG. 3 is a flow diagram of DEFINE DYNAMIC SCAN LEVEL POLICY OPERATION 204 of FIG. 2 in accordance with one embodiment of the present invention. Referring now to FIG. 3, from an ENTER OPERATION 302, flow moves to a DEFINE FILE CONTEXTS OPERATION 304. In DEFINE FILE CONTEXTS OPERATION 304, file contexts are defined. In one embodiment, a file context is the interrelated conditions in which a file exists.

Illustratively, a file context is the location of a file on a computer system. For example, one file context is that the file is located in a shared directory. A shared directory is a directory that is accessible (shared) by more than one user.

Another file context is that the file is located in a non-shared directory. A non-shared directory is a directory that is exclusively accessible by the user of the host computer system, i.e., is not accessible by other users.

Another file context is the origination (source) of the file. For example, a file context is that the file originated as an attachment to an e-mail. As another example, a file context is that the file with loaded on the host computer system from a disk by the user.

Another file context is the exploitability of the file. For example, certain types of files may contain exploits, i.e., malicious code. However, if the host computer system does not have the exploitable version of the application that uses the file, then the file is not exploitable, although the file contains malicious code. Conversely, the file context of the file is different if the host computer system does have the exploitable version of the application that uses the file.

Another file context is the context under which the file is being accessed. For example, if the file is being accessed to copy the file from a non-shared directory to another non-shared directory on the same host computer system, the file has a first context. However, if the file is being accessed to copy the file from a non-shared directory to a shared directory, the file has a different second context.

Although various examples of file contexts are provided above, the examples are not limiting, and any one of a number of file contexts can be defined. In one example, file contexts are configurable, e.g., by the administrator, and thus the administrator can define any one of a number of file contexts.

From DEFINE FILE CONTEXTS OPERATION 304, flow moves to a DEFINE SCAN LEVELS OPERATION 306. In DEFINE SCAN LEVELS OPERATION 306, scan levels are defined.

To illustrate, various scan levels, e.g., various scanning parameters, for scanning for malicious code are defined. Generally, a scan level is the level at which a scan will be performed.

At a minimum, a high scan level and a low scan level are defined, the high scan level having scanning parameters that are more rigorous than the low scan level. In one example, a scan at a high scan level is a maximum-security scan, i.e., the most thorough scan for malicious code. In one example, during a scan at a high scan level, the file is decrypted, unpacked or otherwise exposed if necessary, and every byte or selected portion(s) of the file is scanned for malicious code.

In one embodiment, a scan at a low scan level is a minimum-security scan, i.e., the least thorough scan for malicious code. In one example, during a scan at a low scan level, the file is not scanned at all.

Other scan levels are possible. In one example, a medium scan level is defined. The medium scan level employs greater security than a low scan level yet less security than a high scan level. Illustratively, a scan at a medium scan level scans every byte or selected portion(s) of the file for malicious code, yet does not decrypt, unpack or otherwise expose the file.

Although various examples of scan levels are provided above, the examples are not limiting, and any one of a number of scan levels can be defined. In one example, scan levels are configurable, e.g., by the administrator, and thus the administrator can define any one of a number of scan levels.

From DEFINE SCAN LEVELS OPERATION 306, flow moves to an ASSOCIATE SCAN LEVELS TO FILE CONTEXTS OPERATION 308. In ASSOCIATE SCAN LEVELS TO FILE CONTEXTS OPERATION 308, scan levels are associated to file context. More particularly, the scan levels defined in DEFINE SCAN LEVELS OPERATION 306 are associated to the file contexts defined in DEFINE FILE CONTEXTS OPERATION 304.

To illustrate, for each file context defined in DEFINE FILE CONTEXTS OPERATION 304, a scan level is associated, the scan level being defined in DEFINE SCAN LEVELS OPERATION 306. Generally, the security risk for each file context is assessed, and the scan level appropriate for the security risk is associated with the file context.

For example, for the file context that the file is located in a shared directory, a high scan level is associated with this file context. Specifically, as the file context is a high-risk file context, i.e., a file in a shared directory is highly accessible, a high scan level is associated with the file context. Accordingly, a file having this file context is subject to maximum security.

Conversely, for the file context that the file is located in a non-shared directory, a low scan level is associated with this file context. Specifically, as the file context is a low risk file context, i.e., a file in a non-shared directory has limited accessibility, a low scan level is associated with the file context. Accordingly, a file having this file context is subject to minimum security.

As another example, for the file context that the file originated as an attachment to an e-mail, a high scan level is associated with this file context. Again, as the file context is a high risk file context, i.e., malicious code often propagates as an attachment to an e-mail, a high scan level is associated with the file context. Accordingly, a file having this file context is subject to maximum security.

As another example, for the file context that the file is loaded on the host computer system from a disk by the user, a low scan level is associated with this file context. Specifically, as the file context is a low risk file context, i.e., the user intentionally and knowingly loaded the file, a low scan level is associated with the file context. Accordingly, a file having this file context is subject to minimum security.

As another example, for the file context that the host computer system does not have the exploitable version of the application that uses the file, a low scan level is associated with this file context. Specifically, as the file context is a low risk file context, i.e., that although the file may contain an exploit, the exploit cannot be exploited, a low scan level is associated with the file context. Accordingly, a file having this file context is subject to minimum security.

Conversely, for the file context that the host computer system does have the exploitable version of the application that uses the file, a high scan level is associated with this file context. Again, as the file context is a high risk file context, i.e., the file may contain an exploit that is exploitable, a high scan level is associated with the file context. Accordingly, a file having this file context is subject to maximum security.

As yet another example, for the file context that the file is being accessed to copy the file from a non-shared directory to another non-shared directory on the same host computer system, a low scan level is associated with this file context. Specifically, as the file context is a low risk file context, i.e., that the file is being copied to a non-shared directory that has limited access, a low scan level is associated with the file context. Accordingly, a file having this file context is subject to minimum security.

Conversely, for the file context that the file is being accessed to copy the file from a non-shared directory to a shared directory, a high scan level is associated with this file context. Again, as the file context is a high risk file context, i.e., that the file is being copied to a shared directory that has greater access, a high scan level is associated with the file context. Accordingly, a file having this file context is subject to maximum security.

In one embodiment, a file context is a collection of granular file contexts. To illustrate, a file context is that the file is loaded into a shared directory on the host computer system from a disk by the user. As the file is loaded on the host computer system from a disk by the user, the file ordinarily would represent a low security risk, and a low scan level would be associated with this file context. However, as the file is loaded into a shared directory, which has an associated high security risk, a high scan level is associated with this file context.

However, the scan level associate with the file context is configurable, e.g., by the administrator. Thus, in another example, although the file is loaded into a shared directory, which ordinarily represents a high security risk, the administrator decides that because the file is loaded into a shared directory by the user, the file represents a low security risk, and associates a low scan level with this file context.

As this example demonstrates, although various examples of the association of scan levels with file contexts are provided above, the examples are not limiting, and any one of a number of associations of scan levels with file contexts can be defined. In one example, associations of scan levels with file contexts are configurable, e.g., by the administrator, and thus the administrator can define any one of a number of associations.

From ASSOCIATE SCAN LEVELS TO FILE CONTEXTS OPERATION 308, flow moves to and exits at an EXIT OPERATION 310 (and returns to a DETERMINE TARGET FILE TO BE SCANNED OPERATION 206 of FIG. 2).

Accordingly, as set forth above, a dynamic scan level policy is a policy which dynamically defines file contexts, scan levels, and associates scan levels to file context.

Referring again to FIG. 2, DEFINE DYNAMIC SCAN LEVEL POLICY OPERATION 204 is optional, and in one embodiment, is not performed. In accordance with this embodiment, flow moves from ENTER OPERATION 202 to DETERMINE TARGET FILE TO BE SCANNED OPERATION 206.

For example, the dynamic scan level policy is loaded into host computer system 102 during installation of malicious code smarts scanning application 106. In accordance with this embodiment, the dynamic scan level policy is already defined and thus DEFINE DYNAMIC SCAN LEVEL POLICY OPERATION 204 is not performed. In another embodiment, the dynamic scan level policy is periodically updated and thus DEFINE DYNAMIC SCAN LEVEL POLICY OPERATION 204 is only periodically performed. For example, the dynamic scan level policy is updated by downloading the dynamic security level policy (or updates thereto) from a security center. In another example, the dynamic scan level policy has previously been defined, e.g., by the administrator, and thus DEFINE DYNAMIC SCAN LEVEL POLICY OPERATION 204 is not performed again.

In DETERMINE TARGET FILE TO BE SCANNED OPERATION 206, a target file to be scanned is determined. Illustratively, the file is to be scanned as part of a periodic scheduled security scan or an on access scan of host computer system 102. The target file to be scanned can be determined using any one of a number of techniques and the particular technique used is not essential to this embodiment.

Figure 4:
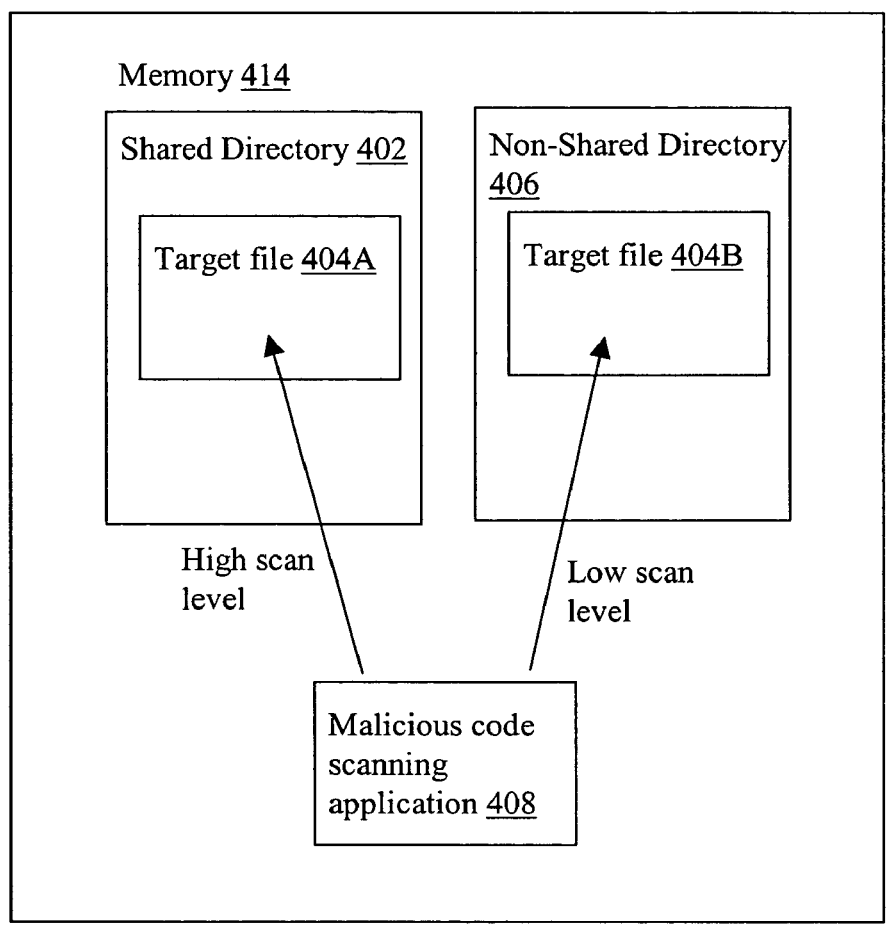
FIG. 4 is a block diagram illustrating malicious code smart scanning of target files in accordance with one embodiment of the present invention.

FIG. 4 is a block diagram 400 illustrating malicious code smart scanning of target files 404A, 404B in accordance with one embodiment of the present invention. Referring now to FIGS. 1 and 4 together, a memory 414, e.g., a part of memory 114 of host computer system 102, includes a shared directory 402 and a non-shared directory 406. Shared directory 402 includes target file 404A. Non-shared directory 406 includes target file 404B.

Target file 404A is identical to target file 404B, e.g., are instances of the same target file. Target files 404A, 404B are to be scanned by a malicious code scanning application 408, e.g., a module of malicious code smart scanning application 106. Malicious code scanning application 408 scans files for malicious code, e.g., using malicious code definitions, as those of skill in the art will understand.

Referring now to FIGS. 2 and 4 together, for purposes of illustration, in DETERMINE TARGET FILE TO BE SCANNED OPERATION 206, a determination is made that target file 404A is to be scanned.

From DETERMINE TARGET FILE TO BE SCANNED OPERATION 206, flow moves to a DETERMINE FILE CONTEXT OF TARGET FILE OPERATION 208. In DETERMINE FILE CONTEXT OF TARGET FILE OPERATION 208, the file context of the target file is determined using the dynamic scan level policy.

As set forth above, the dynamic scan level policy includes a plurality of file contexts. In DETERMINE FILE CONTEXT OF TARGET FILE OPERATION 208, the file is analyzed and matched to one of the file contexts of the dynamic scan level policy.

To illustrate, a determination is made that target file 404A is in shared directory 402. Accordingly, the file context that a file is in a shared directory of the dynamic scan level policy is attributed to target file 404A. Stated another way, the file context of target file 404A is that target file 404A is in shared directory 402.

From DETERMINE FILE CONTEXT OF TARGET FILE OPERATION 208, flow moves to a DETERMINE SCAN LEVEL FOR FILE CONTEXT OPERATION 210. In DETERMINE SCAN LEVEL FOR FILE CONTEXT OPERATION 210, the scan level for the file context of the target file is determined.

As set forth above, the dynamic scan level policy associates scan levels to file context. Accordingly, the scan level associated with the file context of the target file is determined using the dynamic scan level policy.

To illustrate, the scan level for the file context of a file in a shared directory is a high scan level. Accordingly, a determination is made that the scan level for the file context of target file 404A is a high scan level.

From DETERMINE SCAN LEVEL FOR FILE CONTEXT OPERATION 210, flow moves to a SCAN TARGET FILE AT SCAN LEVEL OPERATION 212. In SCAN TARGET FILE AT SCAN LEVEL OPERATION 212, the target file is scanned at the scan level determined in DETERMINE SCAN LEVEL FOR FILE CONTEXT OPERATION 210.

To illustrate, target file 404A is scanned at a high scan level. In one example, target file 404A is subject to a maximum-security scan, i.e., the most thorough scan for malicious code. In one example, target file 404A is decrypted, unpacked or otherwise exposed if necessary, and every byte or selected portion(s) of target file 404A is scanned for malicious code.

From SCAN TARGET FILE AT SCAN LEVEL OPERATION 212, flow moves to a MALICIOUS CODE DETECTED CHECK OPERATION 214. In MALICIOUS CODE DETECTED CHECK OPERATION 214, a determination is made as to whether malicious code is detected in the target file based upon the scan of the target file performed in SCAN TARGET FILE AT SCAN LEVEL OPERATION 212. The determination of whether the target file contains malicious code can be performed using any one of a number of techniques, and the particular technique used is not essential to this embodiment.

If a determination is made that malicious code is detected in MALICIOUS CODE DETECTED CHECK OPERATION 214, flow moves to a TAKE PROTECTIVE ACTION OPERATION 216. Conversely, if a determination is made that malicious code is not detected in MALICIOUS CODE DETECTED CHECK OPERATION 214, flow moves to an ADDITIONAL FILES TO BE SCANNED CHECK OPERATION 220.

Thus, if malicious code is detected in MALICIOUS CODE DETECTED CHECK OPERATION 214, flow moves to TAKE PROTECTIVE ACTION OPERATION 216. In TAKE PROTECTIVE ACTION OPERATION 216, protective action is taken. In some embodiments, the target file containing malicious code is deleted from host computer system 102. In some embodiments, the malicious code and/or the executable program is automatically copied to a text file and sent to a security evaluation center.

In one embodiment, the user is prompted for input prior to taking protective action, e.g., the user is asked for permission to take protective action. From TAKE PROTECTIVE ACTION OPERATION 216, flow moves, optionally, to a NOTIFY OPERATION 218.

In NOTIFY OPERATION 218, the user of host computer system 102 (FIG. 1), and/or a system administrator of the network, e.g., network 124, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From NOTIFY OPERATION 218 (or directly from TAKE PROTECTIVE ACTION OPERATION 216 if NOTIFY OPERATION 218 is not performed), flow moves to ADDITIONAL FILES TO BE SCANNED CHECK OPERATION 220.

In ADDITIONAL FILES TO BE SCANNED CHECK OPERATION 220, a determination is made as whether there are additional files to be scanned. If there are no more files to be scanned, e.g., the periodic scheduled scan or on access scan is complete, flow moves to and exits at an EXIT OPERATION 222. Conversely, if there is at least one additional file to be scanned, flow moves from ADDITIONAL FILES TO BE SCANNED CHECK OPERATION 220 and returns to DETERMINE TARGET FILE TO BE SCANNED OPERATION 206, where the next target file to be scanned is determined.

To illustrate, in the case were target file 404A does not contain malicious code, a determination is made the target file 404A does not contain malicious code in MALICIOUS CODE DETECTED CHECK OPERATION 214 and flow moves to ADDITIONAL FILES TO BE SCANNED CHECK OPERATION 220.

In ADDITIONAL FILES TO BE SCANNED CHECK OPERATION 220, a determination is made that there is an additional file to be scanned, i.e., at least target file 404B in accordance with this illustration. Accordingly, flow returns to DETERMINE TARGET FILE TO BE SCANNED OPERATION 206.

In DETERMINE TARGET FILE TO BE SCANNED OPERATION 206, a determination is made that target file 404B is to be scanned, and flow moves to DETERMINE FILE CONTEXT OF TARGET FILE OPERATION 208.

In DETERMINE FILE CONTEXT OF TARGET FILE OPERATION 208, the file context of target file 404B is determined. To illustrate, a determination is made that target file 404B is in non-shared directory 406. Accordingly, the file context that a file is in a non-shared directory of the dynamic scan level policy is attributed to target file 404B. Stated another way, the file context of target file 404B is that target file 404B is in non-shared directory 406.

From DETERMINE FILE CONTEXT OF TARGET FILE OPERATION 208, flow moves to DETERMINE SCAN LEVEL FOR FILE CONTEXT OPERATION 210. In DETERMINE SCAN LEVEL FOR FILE CONTEXT OPERATION 210, the scan level for the file context of target file 404B is determined. To illustrate, the scan level for the file context of a file in a non-shared directory is a low scan level. Accordingly, a determination is made that the scan level for the file context of target file 404B is a low scan level.

From DETERMINE SCAN LEVEL FOR FILE CONTEXT OPERATION 210, flow moves to SCAN TARGET FILE AT SCAN LEVEL OPERATION 212. In SCAN TARGET FILE AT SCAN LEVEL OPERATION 212, target file 404B is scanned at the scan level determined in DETERMINE SCAN LEVEL FOR FILE CONTEXT OPERATION 210. To illustrate, target file 404B is scanned at a low scan level. In one example, target file 404A is subject to a minimum-security scan, e.g., is not scanned at all.

From SCAN TARGET FILE AT SCAN LEVEL OPERATION 212, flow moves to a MALICIOUS CODE DETECTED CHECK OPERATION 214, which is performed as discussed above.

Accordingly, target files 404A, 404B, which are identical files, are scanned for malicious code at different scan levels, i.e., different levels of security, based upon the different file contexts of target files 404A, 404B. Generally, a variable scan of files based on file context is performed.

Further, target file 404A having a file context indicating that the file is a high security risk is scanned at a high scan level, i.e., is subject to a maximum-security scan. In this manner, high-level security is maintained. Conversely, target file 404B having a file context indicating that the file is a low security risk is scanned at a low scan level, i.e., is subject to a minimum-security scan, e.g., no scan at all. In this manner, high-performance is maintained, i.e., resources which would otherwise be used for scanning target file 404B are available for other uses. Generally, high security is maintained while at the same time maximum performance is achieved.

Referring again to FIG. 1, although malicious code smart scanning application 106 is referred to as an application, this is illustrative only. Malicious code smart scanning application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store computer readable code in accordance with an embodiment of the present invention. Some non-transitory examples of computer program products are CD-ROM discs, DVDs, ROM cards, floppy discs, magnetic tapes, computer hard drives, and servers on a network.

As illustrated in FIG. 1, this medium belongs to the computer system itself. However, the medium is also removed from the computer system. For example, malicious code smart scanning application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute malicious code smart scanning application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, malicious code smart scanning application 106 in accordance with one embodiment of the present invention can be implemented in a wide variety of computer system configurations. In addition, malicious code smart scanning application 106 could be stored as different modules in memories of different devices. For example, malicious code smart scanning application 106 could initially be stored in server system 130, and as necessary, a portion of malicious code smart scanning application 106 could be transferred to host computer system 102 and executed on host computer system 102. Consequently, part of the malicious code smart scanning functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, malicious code smart scanning application 106 is stored in memory 136 of server system 130. Malicious code smart scanning application 106 is transferred over network 124 to memory 114 in host computer system 102. In this embodiment, network interface 138 and I/O interface 110 would include analog modems, digital modems, or a network interface card. If modems are used, network 124 includes a communications network, and malicious code smart scanning application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A non-transitory computer-program product comprising a computer readable medium containing computer program code comprising:
   a malicious code smart scanning application for defining a dynamic scan level policy for associating malicious code scan levels with file contexts,
      wherein said dynamic scan level policy includes a plurality of file contexts;
      wherein a file context of a file is based on a location of origination storage of the file on a computer system executing the malicious code smart scanning application; and
      each file context in said plurality of file contexts is assigned a malicious code scan level, based on a security risk of the file context, from a plurality of malicious code scan levels,
   wherein said plurality of malicious code scan levels includes at least a maximum security malicious code scan level, and a minimum security malicious code scan level wherein each malicious code scan level defines a different level of scrutiny that a file is subject to in scanning the file for malicious code wherein said maximum security malicious code scan level having malicious code scanning parameters that are more rigorous than malicious code scanning parameters of said minimum security malicious code scan;
   a file context with a high security risk is assigned the maximum security malicious code scan level, and a file context with a low security risk is assigned the minimum level malicious code scan level;
   said malicious code smart scanning application further for determining a file context of a target file;
   said malicious code smart scanning application further for determining a malicious code scan level for said file context using said dynamic scan level policy; and
   said malicious code smart scanning application further for scanning said target file, at said malicious code scan level, for malicious code.

2. The computer-program product of claim 1 wherein said defining a dynamic scan level policy comprises defining said plurality of file contexts.

3. The computer-program product of claim 1 wherein a scan of a file at said maximum security malicious code scan level comprises scanning every byte or selected portion(s) of said file.

4. The computer-program product of claim 1 wherein a scan of a file at said minimum security malicious code scan level comprises not scanning said file.

5. The computer-program product of claim 1 wherein said malicious code smart scanning application is further for determining said target file.

6. The computer-program product of claim 1 wherein said malicious code smart scanning application is further for determining if the malicious code is detected in said target file during said scanning.

7. The computer-program product of claim 2 wherein the location of origination storage of the file is a non-shared directory, said determining a malicious code scan level for said file context using said dynamic scan level policy comprising determining that said malicious code scan level is the minimum security malicious code scan level.

8. The computer-program product of claim 2 wherein the location of origination storage of the file is a shared directory, said determining a malicious code scan level for said file context using said dynamic scan level policy comprising determining that said malicious code scan level is the maximum security malicious code scan level.

9. The computer-program product of claim 2 wherein a file context of a file further comprises the exploitability of said file.

10. The computer-program product of claim 2 wherein a file context of a file further comprises a context under which said file is being accessed.

11. The computer-program product of claim 6 wherein upon determining that said malicious code is detected, said malicious code smart scanning application is further for taking protective action to protect a computer system from said malicious code.

12. The computer-program product of claim 6 wherein said malicious code smart scanning application is further for determining whether additional files are to be scanned.

13. A computer system comprising:
   a memory having stored therein a malicious code smart scanning application; and
   a processor coupled to said memory, wherein execution of said malicious code smart scanning application generates a method comprising:
      defining a dynamic scan level policy for associating malicious code scan levels with file contexts,
         wherein said dynamic scan level policy includes a plurality of file contexts;
         wherein a file context of a file is based on a location of origination storage of the file on a computer system executing the malicious code smart scanning application; and
         each file context in said plurality of file contexts is assigned a malicious code scan level, based on a security risk of the file context, from a plurality of malicious code scan levels,
            wherein said plurality of malicious code scan levels includes at least a maximum security malicious code scan level, and a minimum security malicious code scan level wherein each malicious code scan level defines a different level of scrutiny that a file is subject to in scanning the file for malicious code wherein said maximum security malicious code scan level having malicious code scanning parameters that are more rigorous than malicious code scanning parameters of said minimum security malicious code scan; and
         a file context with a high security risk is assigned the maximum security malicious code scan level, and a file context with a low security risk is assigned the minimum level malicious code scan level;
      determining a file context of a target file;
         determining a malicious code scan level for said file context using said dynamic scan level policy; and
         scanning said target file, at said malicious code scan level, for malicious code.

14. A computer-implemented method comprising:
   executing, on a processor, a malicious code smart scanning application, wherein said executing includes:
      defining a dynamic scan level policy for associating malicious code scan levels with file contexts,
         wherein said dynamic scan level policy includes a plurality of file contexts;
         wherein a file context of a file is based on a location of origination storage of the file on a computer system executing the malicious code smart scanning application; and
         each file context in said plurality of file contexts is assigned a malicious code scan level, based on a security risk of the file context, from a plurality of malicious code scan levels,
            wherein said plurality of malicious code scan levels includes at least a maximum security malicious code scan level, and a minimum security malicious code scan level wherein each malicious code scan level defines a different level of scrutiny that a file is subject to in scanning the file for malicious code wherein said maximum security malicious code scan level having malicious code scanning parameters that are more rigorous than malicious code scanning parameters of said minimum security malicious code scan; and
         a file context with a high security risk is assigned the maximum security malicious code scan level, and a file context with a low security risk is assigned the minimum level malicious code scan level;
      determining a file context of a target file;
      determining a malicious code scan level for said file context using said dynamic scan level policy; and
      scanning said target file, at malicious code said scan level, for malicious code.

* * * * *